(12) United States Patent
Zhang

(10) Patent No.: US 12,506,578 B2
(45) Date of Patent: Dec. 23, 2025

(54) METHOD AND DEVICE FOR WIRELESS COMMUNICATION

(71) Applicant: BUNKER HILL TECHNOLOGIES LLC, Allen, TX (US)

(72) Inventor: Xiaobo Zhang, Shanghai (CN)

(73) Assignee: BUNKER HILL TECHNOLOGIES LLC, Allen, TX (US)

( * ) Notice: Subject to any disclaimer, the term of this patent is extended or adjusted under 35 U.S.C. 154(b) by 737 days.

(21) Appl. No.: 17/735,127

(22) Filed: May 3, 2022

(65) Prior Publication Data

US 2022/0286256 A1 Sep. 8, 2022

Related U.S. Application Data

(63) Continuation of application No. PCT/CN2020/121085, filed on Oct. 15, 2020.

(30) Foreign Application Priority Data

Nov. 5, 2019 (CN) .......................... 201911070947.9
Nov. 19, 2019 (CN) .......................... 201911135080.0

(51) Int. Cl.
*H04L 5/00* (2006.01)

(52) U.S. Cl.
CPC .......... *H04L 5/0051* (2013.01); *H04L 5/0064* (2013.01)

(58) Field of Classification Search
CPC .............................. H04L 5/0051; H04L 5/0064
See application file for complete search history.

(56) References Cited

U.S. PATENT DOCUMENTS

2014/0233437 A1 8/2014 Abdoli
2016/0088607 A1 3/2016 Sorrentino
(Continued)

FOREIGN PATENT DOCUMENTS

CN 105101387 A 11/2015
CN 107005799 A 8/2017
(Continued)

OTHER PUBLICATIONS

Huawei et al., "Sidelink synchronization mechanism for NR V2X", 3GPP TSG RAN WG1 Meeting #98bis, Chongqing, China, Oct. 14-20, 2019, R1-1910057 (Year: 2019).*
(Continued)

*Primary Examiner* — Joseph A Bednash
(74) *Attorney, Agent, or Firm* — Ascenda Law Group, PC

(57) ABSTRACT

A first node receives first information and transmits second and third information. The first information indicates a first time window, the second information indicates a second time window, and the third information indicates whether the second time window is synchronous with the first time window. In scenarios involving long-distance communication between a user equipment (UE) and a base station, particularly in non-terrestrial networks (NTN), pre-compensation can be made for a timing advance. When an NTN UE engages in device-to-device (D2D) networking with other UEs, an indication of whether there is pre-compensation for timing advance can serve as a reference for the synchronization reference source selection. With other conditions still (Continued)

unchanged, an NTN-aided D2D UE which has pre-compensated for the timing advance is preferentially selected as a synchronization reference source.

11 Claims, 6 Drawing Sheets

(56) References Cited

U.S. PATENT DOCUMENTS

| | | | |
|---|---|---|---|
| 2018/0227867 A1* | 8/2018 | Park | H04W 72/30 |
| 2019/0313357 A1 | 10/2019 | Wang | |
| 2020/0229114 A1* | 7/2020 | Ryu | H04W 4/40 |

FOREIGN PATENT DOCUMENTS

| | | | |
|---|---|---|---|
| CN | 107306417 A | 10/2017 | |
| CN | 108029084 A | 5/2018 | |
| CN | 108809553 A | 11/2018 | |
| CN | 109076478 A | 12/2018 | |
| CN | 109245869 A | 1/2019 | |
| CN | 109392078 A | 2/2019 | |
| CN | 110167186 A | 8/2019 | |
| CN | 110301143 A | 10/2019 | |
| EP | 3499921 A1 | 6/2019 | |
| WO | 2018222276 A1 | 12/2018 | |
| WO | 2019029227 A1 | 2/2019 | |
| WO | 2019063108 A1 | 4/2019 | |
| WO | 2019190164 A1 | 10/2019 | |

OTHER PUBLICATIONS

ISR received in application No. PCT/CN2020/121085 dated Dec. 3, 2020.

First Office Action of Chinses patent application No. CN201911135080.0 dated Nov. 1, 2021.

First Search Report of Chinses patent application No. CN201911135080.0 dated Oct. 22, 2021.

Notification to Grant Patent Right for Invention of Chinses patent application No. CN201911135080.0 dated Feb. 25, 2022.

3rd Generation Partnership Project; Technical Specification Group Radio Access Network;Study on New Radio (NR) to support non-terrestrial networks (Release 15) 3GPP TR 38.811 V15.2.0 Sep. 30, 2019.

3rd Generation Partnership Project; Technical Specification Group Radio Access Network; Solutions for NR to support non-terrestrial networks (NTN) (Release 16) 3GPP TR 38.821 V0.8.0 Sep. 30, 2019.

Nokia, Nokia Shanghai Bell NTN Requirements for UE Location 3GPP TSG RAN WG1 Meeting #97 R1-1906089 May 17, 2019.

International Preliminary Report on Patentability issued May 10, 2022, from The International Bureau of WIPO, for International Patent Application No. PCT/CN2020/121085 (filed Oct. 15, 2020), 10 pgs.

Written Opinion mailed Dec. 3, 2020, from the ISA/CN, for International Patent Application No. PCT/CN2020/121085 (filed Oct. 15, 2020), 8 pgs.

* cited by examiner

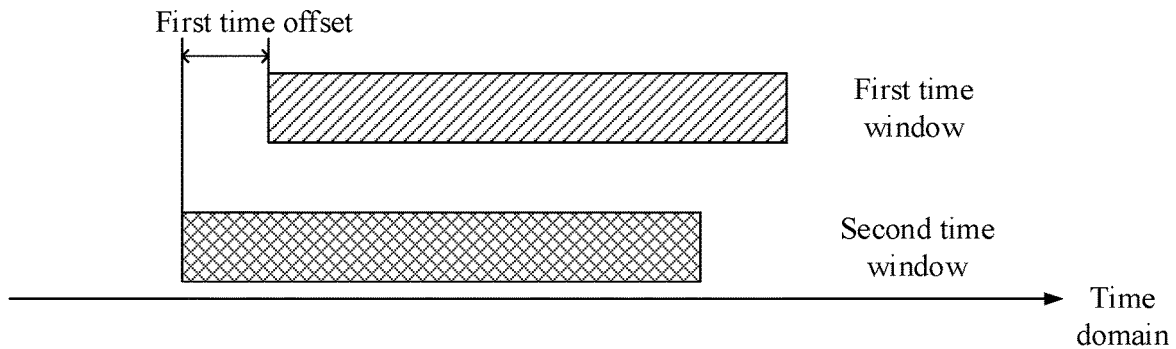
FIG. 6
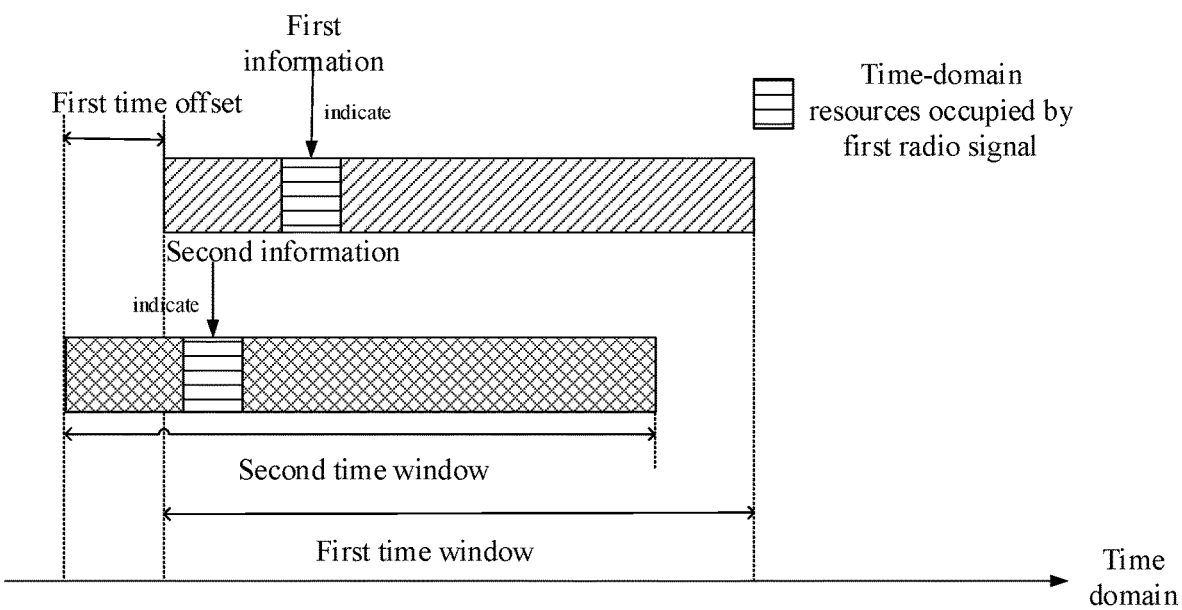
FIG. 7
fourth information being detected —used to determine transmission of→ third information
FIG. 8
second radio signal —used to indicate→ first time resource pool
FIG. 9 third radio signal —used to indicate→ synchronous reference source
FIG. 10
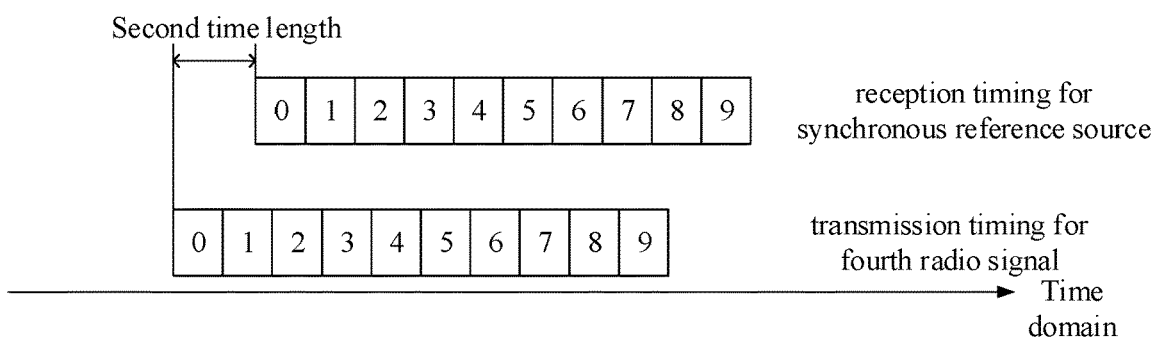
FIG. 11
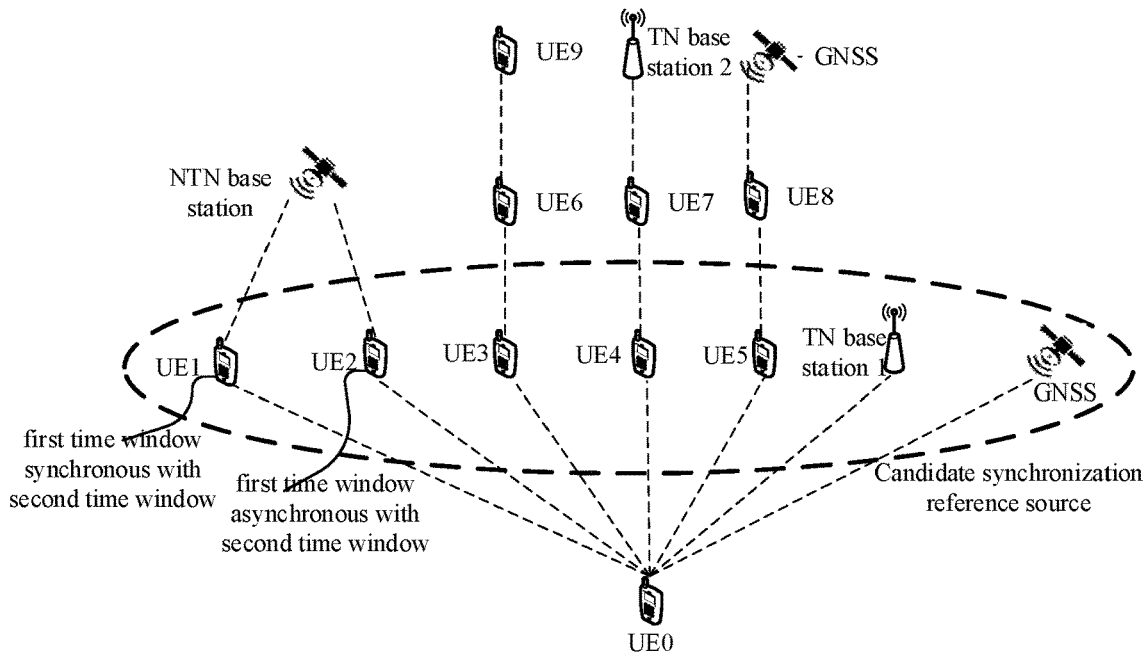
FIG. 12
FIG. 13

METHOD AND DEVICE FOR WIRELESS COMMUNICATION

CROSS REFERENCE TO RELATED APPLICATIONS

This application is a continuation of International Patent application No. PCT/CN2020/121085, filed on Oct. 15, 2020, which claims the priority benefit of Chinese Patent Application No. 201911135080.0, filed on Nov. 19, 2019 and the priority benefit of Chinese Patent Application No. 201911070947.9, filed on Nov. 5, 2019, the full disclosure of which is incorporated herein by reference.

BACKGROUND

Technical Field

The present disclosure relates to transmission methods and devices in wireless communication systems, and in particular to a method and a device for large-delay transmission.

Related Art

With the communications requests becoming more extensive and demanding, the 3rd Generation Partner Project (3GPP) kicks off studies on Non-Terrestrial Network (NTN), and at the 3GPP RAN #80 conference it was decided that a study item (SI) of solutions to New Radio (NR)-supported NTN shall be conducted, as a continuity of the previously proposed NR-supported NTN SI (RP-171450). One important aspect of the study item is Timing Advance (TA). D2D is a means of communications between User Equipments (UEs) via Sidelink (SL). The studies on NTN-assisted D2D communications will become an orientation for future evolution of the 3GPP.

SUMMARY

In a Device to Device (D2D)system, the Synchronization Reference Source for a D2D user includes e-NodeB (eNB), Global Navigation Satellite System (GNSS) and SyncRef UE, and synchronization information sent by the D2D user can be deduced from information/signals received from E-UTRAN (in coverage) or by a transmit UE as a synchronization reference or by GNSS. For a UE within coverage, the Direct Frame Number (DFN) of the node can be determined from the System Frame Number (SFN) of the base station, and the DFN is used for determining a time-domain location for transmitting SLSS, which highly depends upon the timing synchronization.

In the NTN scenario, there is a large distance between the NTN satellite base station and the terrestrial UE, so the transmission delay is much larger than the Terrestrial Network (TN), which makes an uplink Timing Advance (TA) of the UE greater than the maximum value specified in the current protocols. For a UE with the positioning capability, the scheme of TA Pre-compensation can be adopted to make compensation for the delay incurred for a shortest distance between the satellite and the ground in advance on the side of eNB or UE, for UE Differential Delay caused by the geographical location on the earth, a solution is to use a conventional TA scheme. But the scheme of pre-compensation is not applicable when the UE is incapable of positioning. However, whether pre-compensation is made for TA will influence the DFN of a D2D user. For a user which expects to choose an NTN-aided D2D user as a synchronization reference source, if there are two candidate synchronization reference sources co-existing, of which one is an NTN-aided D2D user with TA Pre-compensation, and the other is an NTN-aided D2D user without TA Pre-compensation, and meanwhile their priorities cannot be determined, the user may choose an inappropriate synchronization reference source from between them. Therefore, when an NTN-assisted D2D user transmits synchronization information, it needs to indicate whether pre-compensation has been made for TA.

To address the above problem, the present disclosure provides a solution. Although the description above only takes NTN scenarios as an example; the present disclosure is also applicable to scenarios of terrestrial transmissions, where similar technical effects can be achieved. Additionally, the adoption of a unified solution for various scenarios contributes to the reduction of hardcore complexity and costs.

It should be noted that if no conflict is incurred, embodiments in any node in the present disclosure and the characteristics of the embodiments are also applicable to any other node, and vice versa. What's more, the embodiments in the present disclosure and the characteristics in the embodiments can be arbitrarily combined if there is no conflict.

The present disclosure provides a method in a first node for wireless communications, comprising:
  receiving first information; and
  transmitting second information and third information;
  herein, the first information is used for indicating a first time window, the second information is used for indicating a second time window, and the third information is used for indicating whether the second time window is synchronous with the first time window.

In one embodiment, a problem to be solved in the present disclosure includes: since the transmission delay in NTN is much larger than that in TN, for a UE with the positioning functionality, an NTN base station can make pre-compensation for delay; in D2D communications, when a UE adopts an NTN base station as a synchronization reference source, the UE shall know whether the NTN base station has made pre-compensation for delay when performing sidelink synchronization timing.

In one embodiment, characteristics of the above method include: the first information is a System Frame Number (SFN), while the second information is a Direct Frame Number (DFN), the first time window is a cycle for the SFN, while a second time window is a cycle for the DFN, the third information is used for indicating whether the SFN is identical to the DFN.

In one embodiment, an advantage of the above method includes: the third information only occupies a small amount of bit information to indicate whether the first time window is synchronous with the second time window, so the signaling overhead is low.

In one embodiment, an advantage of the above method includes: by indicating whether pre-compensation is made for TA, the prerequisites of priority can be provided for the choice of synchronization reference source.

According to one aspect of the present disclosure, characterized by:
  transmitting a first radio signal; when the first radio signal is transmitted in a mainlink, the first radio signal is kept in synchronization with the first time window; when the first radio signal is transmitted in a sidelink, the first radio signal is kept in synchronization with the second time window.

According to one aspect of the present disclosure, characterized by monitoring fourth information; herein, only when the fourth information is detected will the third information be transmitted.

In one embodiment, characteristics of the above method include: only when a transmitter for the first information is a large-time-delay base station, especially an NTN base station will the third information be transmitted.

In one embodiment, an advantage of the above method includes: unnecessary information transmission can be avoided and signaling overhead can be reduced through detection on fourth information.

According to one aspect of the present disclosure, characterized by transmitting a second radio signal; herein, the second radio signal indicates a first time resource pool in the second time window.

According to one aspect of the present disclosure, characterized by transmitting a third radio signal; herein, the third radio signal is used for indicating that a transmitter for the first information is chosen as a synchronization reference source.

According to one aspect of the present disclosure, characterized by transmitting a first parameter, when the third information indicates that the first time window is asynchronous with the second time window; herein, the fourth information is used to determine the first parameter.

The present disclosure provides a method in a second node for wireless communications, comprising:

receiving second information and third information;

herein, the second information is used for indicating a second time window, the third information is used for indicating whether the second time window is synchronous with a first time window, the first time window being indicated by first information.

According to one aspect of the present disclosure, characterized by:

determining a synchronization reference source; and transmitting a fourth radio signal;

herein, a reception timing for a synchronization signal transmitted by the synchronization reference source which is determined is used to determine a transmission timing for the fourth radio signal, the third information is used to determine whether a transmitter for the second information is chosen as a synchronization reference source.

According to one aspect of the present disclosure, characterized by receiving a first radio signal; the first radio signal is kept in synchronization with the second time window.

According to one aspect of the present disclosure, characterized in that the second receiver receives a second radio signal; herein, the second radio signal indicates a first time resource pool in the second time window.

According to one aspect of the present disclosure, characterized by receiving a third radio signal; herein, the third radio signal is used for indicating that a transmitter for the first information is chosen as a synchronization reference source for a transmitter for the third information.

According to one aspect of the present disclosure, characterized by receiving a first parameter, when the third information indicates that the first time window is asynchronous with the second time window; herein, the fourth information is used to determine the first parameter.

The present disclosure provides a method in a third node for wireless communications, comprising:

transmitting first information;

herein, the first information is used for indicating a first time window, the second information is used for indicating a second time window, and the third information is used for indicating whether the second time window is synchronous with the first time window.

According to one aspect of the present disclosure, characterized by receiving a first radio signal; when the first radio signal is received in a mainlink, the first radio signal is kept in synchronization with the first time window; when the first radio signal is received in a sidelink, the first radio signal is kept in synchronization with the second time window.

According to one aspect of the present disclosure, characterized in that a receiver for the first information monitors fourth information; herein, only when the fourth information is detected will the third information be transmitted by the receiver for the first information, the fourth information being a parameter of the third node.

According to one aspect of the present disclosure, characterized in that a second radio signal is transmitted by a receiver for the first information; herein, the second radio signal indicates a first time resource pool in the second time window.

According to one aspect of the present disclosure, characterized in that a third radio signal is transmitted by a receiver for the first information; herein, the third radio signal is used for indicating that the third node is chosen as a synchronization reference source.

According to one aspect of the present disclosure, characterized in that when the third information indicates that the first time window is asynchronous with the second time window, a first parameter is transmitted by a receiver for the first information; herein, the fourth information is used to determine the first parameter.

The present disclosure provides a first node for wireless communications, comprising:

a first receiver, receiving first information; and a first transmitter, transmitting second information and third information;

herein, the first information is used for indicating a first time window, the second information is used for indicating a second time window, and the third information is used for indicating whether the second time window is synchronous with the first time window.

The present disclosure provides a second node for wireless communications, comprising:

a second receiver, receiving second information and third information;

herein, the second information is used for indicating a second time window, the third information is used for indicating whether the second time window is synchronous with a first time window, the first time window being indicated by first information.

The present disclosure provides a third node for wireless communications, comprising:

a third transmitter, transmitting first information;

herein, the first information is used for indicating a first time window, the second information is used for indicating a second time window, and the third information is used for indicating whether the second time window is synchronous with the first time window.

In one embodiment, compared with the prior art, the present disclosure is advantageous in the following aspects:

When a D2D UE is choosing a synchronization reference source, there may be multiple candidate synchronization reference sources served by the NTN base station to choose from. Some of these candidates have already been made pre-compensation and others have not. Through the indication information provided by the present disclosure, the D2D UE can acquire information of TA Pre-compensation for the candidate synchronization reference source so that it is able to preferentially choose a candidate synchronization reference source with TA Pre-compensation as its synchronization reference source.

BRIEF DESCRIPTION OF THE DRAWINGS

Other features, objects and advantages of the present disclosure will become more apparent from the detailed description of non-restrictive embodiments taken in conjunction with the following drawings:

FIG. 6 illustrates a schematic diagram of a first time offset between a first time window and a second time window according to one embodiment of the present disclosure.

FIG. 7 illustrates a schematic diagram of time-domain resources for transmitting a first radio signal according to one embodiment of the present disclosure.

FIG. 8 illustrates a schematic diagram of fourth information being detected to be used for determining to transmit third information according to one embodiment of the present disclosure.

FIG. 9 illustrates a schematic diagram of a second radio signal used to indicate a first time resource pool according to one embodiment of the present disclosure.

FIG. 10 illustrates a schematic diagram of a third radio signal being used to indicate a synchronization reference source according to one embodiment of the present disclosure.

FIG. 11 illustrates a schematic diagram of fourth information used to determine a first parameter according to one embodiment of the present disclosure.

FIG. 12 illustrates a schematic diagram of a reception timing for a synchronization signal transmitted by a synchronization reference source being used to determine a transmission timing for a fourth radio signal according to one embodiment of the present disclosure.

FIG. 13 illustrates a schematic diagram of selecting a synchronization reference source from K candidate synchronization reference sources according to one embodiment of the present disclosure.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
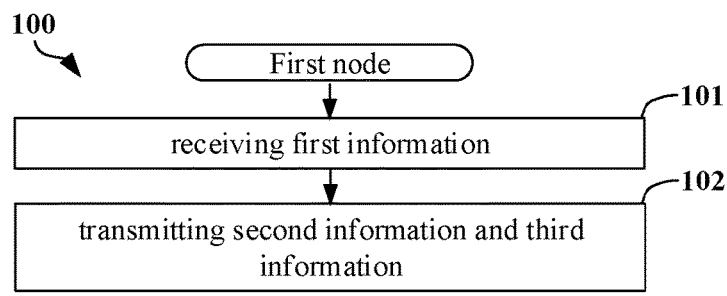
FIG. 1 illustrates a flowchart of transmission of first information, second information and third information according to one embodiment of the present disclosure.

Embodiment 1 illustrates a flowchart of transmission of first information, second information and third information according to one embodiment of the present disclosure, as shown in FIG. 1. In FIG. 1, each step represents a step, it should be particularly noted that the sequence order of each box herein does not imply a chronological order of steps marked respectively by these boxes.

In Embodiment 1, the first node in the present disclosure receives the first information in step 101; and transmits second information and third information in step 102; the first information is used for indicating a first time window, the second information is used for indicating a second time window, and the third information is used for indicating whether the second time window is synchronous with the first time window.

In one embodiment, a transmitter for the first information is a base station (eNB).

In one embodiment, a transmitter for the first information is a Non-Terrestrial Network (NTN) base station.

In one embodiment, the NTN base station is one of Geostationary Earth Orbiting (GEO) satellite, Medium Earth Orbiting (MEO) satellite, Low Earth Orbit (LEO) satellite, Highly Elliptical Orbiting (HEO) satellite or an Airborne Platform.

In one embodiment, a receiver for the second information and the third information is a UE.

In one embodiment, a receiver for the second information and the third information is a device used for sidelink communications.

In one embodiment, a transmitter for the first information is a synchronization reference source for the first node.

In one embodiment, the first node is a candidate synchronization reference source for a receiver for the second information.

In one embodiment, the synchronization reference source is a node to refer to for UE synchronization timing.

In one embodiment, the first information is used to determine a Downlink RadioFrame.

In one embodiment, the first information is used to determine an Uplink RadioFrame.

In one embodiment, the first information is all or part of a PHY (L1) signaling.

In one embodiment, the first information is all or part of a higher-layer (L2, L3) signaling.

In one embodiment, the first information is transmitted on a Physical Broadcast channel (PBCH).

In one embodiment, the first information comprises a MasterInformationBlock (MIB).

In one embodiment, the first information comprises a SystemInformationBlock (SIB).

In one embodiment, the first information is all or partial fields in a MeasResultsIE (i.e., InformationElement).

In one embodiment, the first information is all or partial fields in a MeasResultsIE (i.e., InformationElement).

In one embodiment, the first information is all or partial fields in a SL-CommResourcePoolIE (i.e., InformationElement).

In one embodiment, the first information is one of sl-Subframe, sl-SubframeRef, sl-Subframe-r14, or sl-SubframeRef-r15.

In one embodiment, the first information comprises a SystemFrameNumber (SFN).

In one embodiment, the first information comprises a SystemSubframeNumber.

In one embodiment, the first information is used for generating a Scrambling Sequence.

In one embodiment, the first information is all or part of a Media Access Control (MAC) layer signaling.

In one embodiment, the first information comprises all or part of a Media Access Control (MAC) RadomAccessResponse (RAR).

In one embodiment, the first information comprises a TimingAdvanceCommand (TAC) Media Access Control (MAC) ControlElement (CE).

In one embodiment, the first information comprises a MasterInformationBlock (MIB) and a TimingAdvanceCommand (TAC).

In one embodiment, the first time window is deduced by advancing a reception time for a synchronization signal received by the first node by a first time offset.

In one embodiment, a TimingAdvanceCommand (TAC) Media Access Control (MAC) ControlElement (CE) comprised by the first information is used to indicate the first time offset.

In one embodiment, the first time offset is a time length by which the first time window that is indicated by the first information is advanced relative to an uplink timing advance.

In one embodiment, the first time offset is a time length by which the first time window that is indicated by the first information is advanced relative to a downlink timing advance.

In one embodiment, the first time offset is used to determine all delays between a transmitter for the first information and the first node.

In one embodiment, the first time offset is used to determine a first delay between a transmitter for the first information and the first node, not including a second delay.

In one embodiment, the first time offset is used to determine a first delay between a transmitter for the first information and the first node, not including a second delay.

In one embodiment, the first delay is used to determine a UE DifferentialDelay between a transmitter for the first information and the first node due to geographical locations.

In one embodiment, the second delay is used to determine a CommonDelay, the CommonDelay referring to a delay corresponding to a shortest distance from a transmitter for the first information to the earth's surface.

In one embodiment, the CommonDelay is notified to the UE by an NTN base station (eNB) via a SystemInformationBlock (SIB).

In one embodiment, the CommonDelay is performed with pre-compensation by the NTN base station (eNB) or the UE side.

In one embodiment, the first time window is explicitly indicated by the first information received by the first receiver.

In one embodiment, the first time window is implicitly indicated by the first information received by the first receiver.

In one embodiment, the first time window is deduced from a reception time for a synchronization signal received by the first node.

In one embodiment, the first time window is obtained according to a downlink synchronization timing.

In one embodiment, the first time window is obtained according to an uplink synchronization timing.

In one embodiment, the first time window is a cycle of a SystemFrameNumber (SFN).

In one embodiment, the first time window occurs periodically, and the period of the first time window is P slots, P being a positive integer.

In one embodiment, P is 1024, the P slots are contiguous.

In one embodiment, P is less than 1024, there is at least one slot interval, before which and after which there is a slot respectively belonging to the first time window.

In one embodiment, P is 10240, the P slots are contiguous.

In one embodiment, P is less than 10240, there is at least one slot interval, before which and after which there is a slot respectively belonging to the first time window.

In one embodiment, the slot is a radio frame.

In one embodiment, the slot is a radio subframe.

In one embodiment, the slot is multiple OFDM symbols.

In one embodiment, the slot is multiple SC-FDMA symbols.

In one embodiment, the second information comprises part of a MasterInformationBlock-SL.

In one embodiment, the second information comprises part of a MasterInformationBlock-SL-V2X.

In one embodiment, the second information is used to determine a sidelink synchronization timing.

In one embodiment, the second information is used for indicating transmission of Frame Numbers of a Sidelinksynchronizing signal (SLSS) and a Sidelink Broadcast Channel (SL-BCH).

In one embodiment, the second information comprises a DirectFrameNumber (DFN), the DFN occupying X bit(s), where X is a positive integer.

In one embodiment, X is equal to 10.

In one embodiment, the second information comprises a DirectSubframeNumber, where the DirectSubframeNumber is a positive integer.

In one embodiment, the DirectSubframeNumber is an integer ranging from 0 to 9.

In one embodiment, the second information comprises an X-th time offset.

In one embodiment, the second information comprises one of a SL-OffsetIndicatorSync, a syncOffsetIndicator, a directSubframeNumber, a directSubframeNumber-r12, a directSubframeNumber, a directFrameNumber, a directFrameNumber-r12, or a directFrameNumber.

In one embodiment, the syncOffsetIndicator is equal to (10*DFN+subframe number) mod 40, where the DFN refers to a DirectFrameNumber, the subframe number is a sub-frame number, and the mod refers to mode operation.

In one embodiment, the SL-OffsetIndicatorSync is equal to (10*DFN+subframe number) mod 160, where the DFN refers to a DirectFrameNumber, the subframe number is a sub-frame number, and the mod refers to mode operation.

In one embodiment, the second time window is explicitly indicated by the second information transmitted by the first transmitter.

In one embodiment, the second time window is implicitly indicated by the second information transmitted by the first transmitter.

In one embodiment, the second time window is used to determine a Sidelink RadioFrame.

In one embodiment, the second time window is a cycle of a DirectFrameNumber (DFN).

In one embodiment, the second time window occurs periodically, and the period of the second time window is Q slots, Q being a positive integer.

In one embodiment, Q is 1024, the Q slots are contiguous.

In one embodiment, Q is less than 1024, there is at least one slot interval, before which and after which there is a slot respectively belonging to the second time window.

In one embodiment, Q is 10240, the Q slots are contiguous.

In one embodiment, Q is less than 10240, there is at least one slot interval, before which and after which there is a slot respectively belonging to the second time window.

In one embodiment, the slot is a radio frame.

In one embodiment, the slot is a radio subframe.

In one embodiment, the slot is multiple OFDM symbols.

In one embodiment, the slot is multiple SC-FDMA symbols.

In one embodiment, when a gap between a start time for the second time window and a start time for the first time window does not exceed a first time length, the second time window is synchronous with the first time window; otherwise, the second time window is asynchronous with the first time window.

In one embodiment, the first time length is related to a maximum adjustment time length of a TAC comprised in the first information.

In one embodiment, when a start time for the second time window and a start time for the first time window are the same, the second time window is synchronous with the first time window; otherwise, the second time window is asynchronous with the first time window.

In one embodiment, when the first time window is advanced by the first time offset in comparison with the second time window, the first time window is synchronous with the second time window.

In one embodiment, the first time window is used to determine a TimingReferenceRadioframe of the second time window.

In one embodiment, a duration of the second time window is the same as a duration of the first time window.

In one embodiment, a duration of the second time window is different from a duration of the first time window.

In one embodiment, a second time window is obtained by advancing the first time window by the first time offset.

In one embodiment, the third information is an indicator, the indicator occupying N bit(s), where N is a positive integer.

In one embodiment, when the N is equal to 1, the indicator being equal to 1 denotes that the second time window is synchronous with the first time window, while the indicator being equal to 0 denotes that the second time window is asynchronous with the first time window.

In one embodiment, when the N is equal to 1, the indicator being equal to 1 denotes that the second time window is asynchronous with the first time window, while the indicator being equal to 0 denotes that the second time window is synchronous with the first time window.

In one embodiment, the third information being a null value denotes that the second time window is synchronous with the first time window, while the third information not being a null value denotes that the second time window is asynchronous with the first time window.

In one embodiment, the third information being a null value denotes that the second time window is asynchronous with the first time window, while the third information not being a null value denotes that the second time window is synchronous with the first time window.

Embodiment 2

Figure 2:
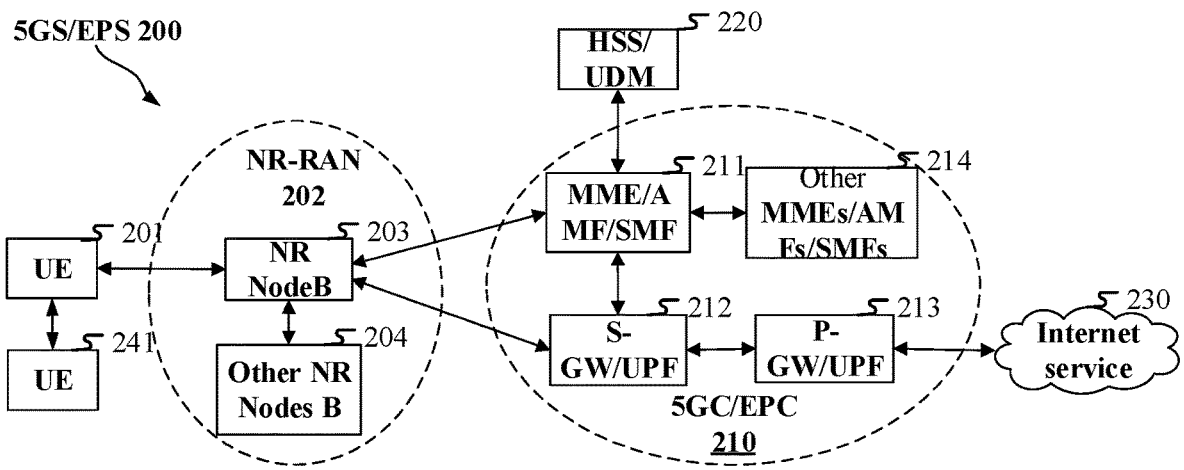
FIG. 2 illustrates a schematic diagram of a network architecture according to one embodiment of the present disclosure.

Embodiment 2 illustrates a schematic diagram of a network architecture according to one embodiment of the present disclosure, as shown in FIG. 2. FIG. 2 is a diagram illustrating a network architecture 200 of 5G NR, Long-Term Evolution (LTE) and Long-Term Evolution Advanced (LTE-A) systems. The 5G NR or LTE network architecture 200 may be called a 5G System/Evolved Packet System (5GS/EPS) 200 or other suitable terminology. The 5GS/EPS 200 may comprise one or more UEs 201, an NG-RAN 202, a 5G-Core Network/Evolved Packet Core (5GC/EPC) 210, a Home Subscriber Server/Unified Data Management(HSS/UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will find it easy to understand that various concepts presented throughout the present disclosure can be extended to networks providing circuit switching services or other cellular networks. The NG-RAN 202 comprises an NR node B (gNB) 203 and other gNBs 204. The gNB 203 provides UE 201 oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, satellite mobile communications, Global Positioning Systems (GPSs), multimedia devices, video devices, digital audio players (for example, MP3 players), cameras, games consoles, unmanned aerial vehicles, air vehicles, narrowband physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMEs/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212. The S-GW/UPF 212 is connected to the P-GW/UPF 213. The P-GW 213 provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming (PSS) services.

In one embodiment, the first node in the present disclosure is the UE201, and the second node in the present disclosure is a terminal within coverage of the gNB203.

In one embodiment, the first node in the present disclosure is the UE201, and the second node in the present disclosure is a terminal out of coverage of the gNB203.

In one embodiment, the first node and the second node in the present disclosure are both served by the gNB203.

In one embodiment, the UE 201 corresponds to the first node in the present disclosure.

In one embodiment, the UE 241 corresponds to the second node in the present disclosure.

In one embodiment, the first node in the present disclosure is the UE201, and the second node in the present disclosure is a terminal within coverage of the gNB203.

In one embodiment, the first node in the present disclosure is the UE201, and the second node in the present disclosure is a terminal out of coverage of the gNB203.

In one embodiment, a radio link between the UE 201 and the UE 241 corresponds to a sidelink (SL) in the present disclosure.

In one embodiment, a radio link from the UE 201 to the NR Node B is an uplink.

In one embodiment, a radio link from the NR Node B to the UE 201 is a downlink.

In one embodiment, the UE 201 supports transmissions in NTN.

In one embodiment, the UE 201 supports transmissions in large-delay-difference networks.

In one embodiment, the UE 201 supports transmissions in TN.

In one embodiment, the UE 241 supports transmissions in NTN.

In one embodiment, the UE 241 supports transmissions in large-delay-difference networks.

In one embodiment, the UE 241 supports transmissions in TN.

In one embodiment, the gNB203 corresponds to the third node in the present disclosure.

In one embodiment, the gNB203 supports transmissions in NTN.

In one embodiment, the gNB203 supports transmissions in large-delay-difference networks.

In one embodiment, the gNB203 supports transmissions in TN.

In one embodiment, the gNB 203 is a MacroCellular base station.

In one embodiment, the gNB203 is a Micro Cell base station.

In one embodiment, the gNB203 is a Pico Cell base station.

In one embodiment, the gNB203 is a Femtocell.

In one embodiment, the gNB203 is a base station supporting large time-delay difference.

In one embodiment, the gNB203 is a flight platform.

In one embodiment, the gNB203 is satellite equipment.

Embodiment 3

Figure 3:
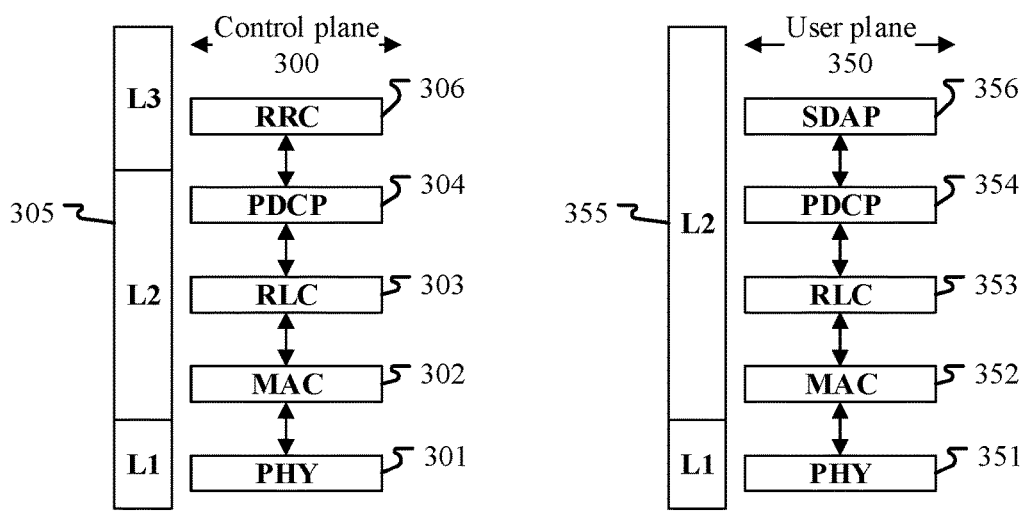
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane according to the present disclosure, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first communication device (UE, gNB or, satellite or aircraft in NTN) and a second communication device (gNB, UE, or satellite or aircraft in NTN) is represented by three layers, i.e., layer 1, layer 2 and layer 3. The layer 1 (L1) is the lowest layer which performs signal processing functions of various PHY layers. The L1 is called PHY 301 in the present disclosure. The layer 2 (L2) 305 is above the PHY 301, and is in charge of the link between the UE and the gNB via the PHY 301. The L2 305 comprises a Medium Access Control (MAC) sublayer 302, a Radio Link Control (RLC) sublayer 303 and a Packet Data Convergence Protocol (PDCP) sublayer 304. The PDCP sublayer 304 provides multiplexing among variable radio bearers and logical channels. The PDCP sublayer 304 provides security by encrypting a packet and provides support for inter-cell handover. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling. The radio protocol architecture in the user plane 350 comprises the L1 layer and the L2 layer. In the user plane 350, the radio protocol architecture used for a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. Although not described in FIG. 3, the first communication device and the second communication device may comprise several higher layers above the L2 355, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the radio protocol architecture in FIG. 3 is applicable to the third node in the present disclosure.

In one embodiment, the first information in the present disclosure is generated by the RRC306.

In one embodiment, the first information in the present disclosure is generate by the MAC302 or the MAC352.

In one embodiment, the first information in the present disclosure is generated by the PHY301 or the PHY351.

In one embodiment, the second information in the present disclosure is generated by the RRC306.

In one embodiment, the second information in the present disclosure is generate by the MAC302 or the MAC352.

In one embodiment, the second information in the present disclosure is generated by the PHY301 or the PHY351.

In one embodiment, the third information in the present disclosure is generated by the RRC306.

In one embodiment, the third information in the present disclosure is generate by the MAC302 or the MAC352.

In one embodiment, the third information in the present disclosure is generated by the PHY301 or the PHY351.

In one embodiment, the first radio signal in the present disclosure is generated by the RRC306.

In one embodiment, the first radio signal in the present disclosure is generate by the MAC302 or the MAC352.

In one embodiment, the first radio signal in the present disclosure is generated by the PHY301 or the PHY351.

In one embodiment, the second radio signal in the present disclosure is generated by the RRC306.

In one embodiment, the second radio signal in the present disclosure is generate by the MAC302 or the MAC352.

In one embodiment, the second radio signal in the present disclosure is generated by the PHY301 or the PHY351.

In one embodiment, the third radio signal in the present disclosure is generated by the RRC306.

In one embodiment, the third radio signal in the present disclosure is generated by the MAC302 or the MAC352.

In one embodiment, the third radio signal in the present disclosure is generated by the PHY301 or the PHY351.

In one embodiment, the fourth radio signal in the present disclosure is generated by the RRC306.

In one embodiment, the fourth radio signal in the present disclosure is generate by the MAC302 or the MAC352.

In one embodiment, the fourth radio signal in the present disclosure is generated by the PHY301 or the PHY351.

Embodiment 4

Figure 4:
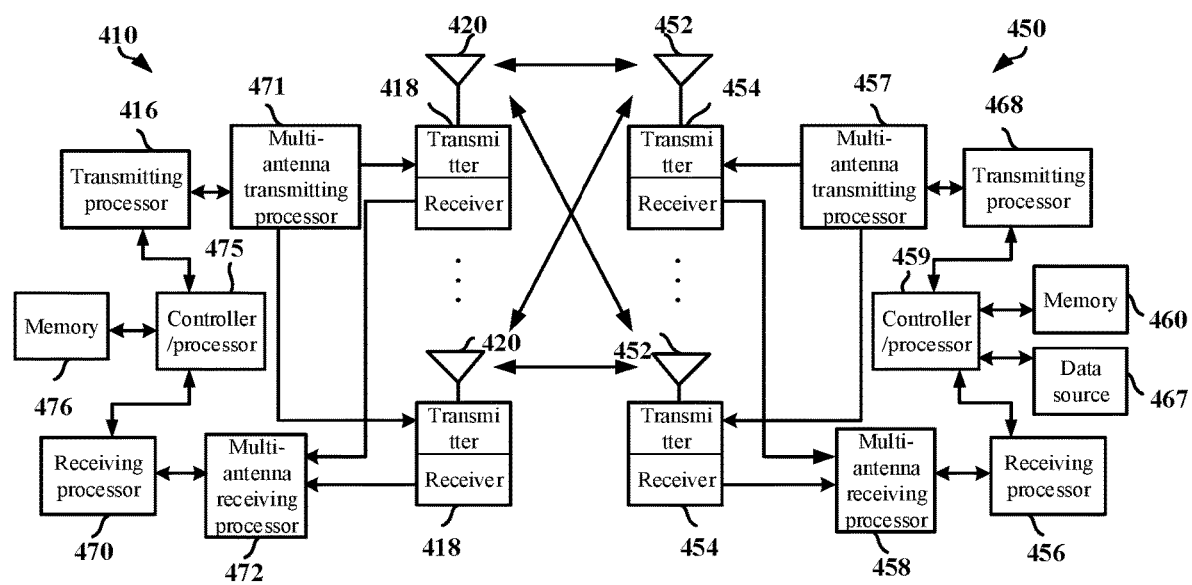
FIG. 4 illustrates a schematic diagram of a first communication device and a second communication device according to one embodiment of the present disclosure.

Embodiment 4 illustrates a schematic diagram of a first communication device and a second communication device according to the present disclosure, as shown in FIG. 4. FIG. 4 is a block diagram of a first communication device 450 and a second communication device 410 in communication with each other in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the second communication device 410, a higher layer packet from a core network is provided to the controller/processor 475. The controller/processor 475 provides functions of the L2 layer. In the transmission from the second communication device 410 to the first communication device 450, the controller/processor 475 provides header compression, encryption, packet segmentation and reordering, and multiplexing between a logical channel and a transport channel, and radio resource allocation of the first communication device 450 based on various priorities. The controller/processor 475 is also responsible for a retransmission of a lost packet, and a signaling to the first communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 410 side and the mapping to signal clusters corresponding to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to different antennas 420.

In a transmission from the second communication device 410 to the first communication device 450, at the first communication device 450, each receiver 454 receives a signal via a corresponding antenna 452. Each receiver 454 recovers information modulated to the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any first communication device 450-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted by the second communication device 410 on the physical channel. Next, the higher-layer data and control signal are provided to the controller/processor 459. The controller/processor 459 provides functions of the L2 layer. The controller/processor 459 can be associated with a memory 460 that stores program code and data. The memory 460 can be called a computer readable medium. In the transmission from the second communication device 410 to the second communication device 450, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer. Or various control signals can be provided to the L3 for processing.

In a transmission from the first communication device 450 to the second communication device 410, at the first communication device 450, the data source 467 is configured to provide a higher-layer packet to the controller/processor 459. The data source 467 represents all protocol layers above the L2 layer. Similar to a transmitting function of the second communication device 410 described in the transmission from the second communication node 410 to the first communication node 450, the controller/processor 459 performs header compression, encryption, packet segmentation and reordering, and multiplexing between a logical channel and a transport channel based on radio resource allocation so as to provide the L2 layer functions used for the user plane and the control plane. The controller/processor 459 is also in charge of a retransmission of a lost packet and a signaling to the second communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the first communication device 450 to the second communication device 410, the function of the second communication device 410 is similar to the receiving function of the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with a memory 476 that stores program code and data. The memory 476 can be called a computer readable medium. In the transmission from the first communication device 450 to the second communication device 410, the controller/processor 475 provides de-multiplexing between a transport channel and a logical channel, packet reassembling, decrypting, header decompression, control signal processing so as to recover a higher-layer packet from the first communication device (UE) 450. The higher-layer packet coming from the controller/processor 475 may be provided to the core network.

In one embodiment, the first communication device 450 comprises at least one processor and at least one memory. The at least one memory comprises computer program codes; the at least one memory and the computer program codes are configured to be used in collaboration with the at least one processor. The first communication device 450 at least receives first information; and transmits second information and third information; herein, the first information is used for indicating a first time window, the second information is used for indicating a second time window, and the third information is used for indicating whether the second time window is synchronous with the first time window.

In one embodiment, the first communication device 450 comprises a memory that stores computer readable instruction program, the computer readable instruction program generates an action when executed by at least one processor, which includes: receiving first information; and transmitting second information and third information; herein, the first information is used for indicating a first time window, the second information is used for indicating a second time window, and the third information is used for indicating whether the second time window is synchronous with the first time window.

In one embodiment, the second communication device 410 comprises at least one processor and at least one memory. The at least one memory comprises computer program codes; the at least one memory and the computer program codes are configured to be used in collaboration with the at least one processor. The second communication device 410 at least receives second information and third information; herein, the second information is used for indicating a second time window, the third information is used for indicating whether the second time window is synchronous with a first time window, the first time window being indicated by first information.

In one embodiment, the second communication device 410 comprises a memory that stores computer readable instruction program, the computer readable instruction program generates an action when executed by at least one processor, which includes: receiving second information and third information; herein, the second information is used for indicating a second time window, the third information is used for indicating whether the second time window is synchronous with a first time window, the first time window being indicated by first information.

In one embodiment, the second communication device 410 comprises at least one processor and at least one memory. The at least one memory comprises computer program codes; the at least one memory and the computer program codes are configured to be used in collaboration with the at least one processor. The second communication device 410 at least transmits first information; herein, the first information is used for indicating a first time window, the second information is used for indicating a second time window, and the third information is used for indicating whether the second time window is synchronous with the first time window.

In one embodiment, the second communication device 410 comprises a memory that stores computer readable instruction program, the computer readable instruction program generates an action when executed by at least one processor, which includes: transmitting first information; herein, the first information is used for indicating a first time window, the second information is used for indicating a second time window, and the third information is used for indicating whether the second time window is synchronous with the first time window.

In one embodiment, the first communication device 450 corresponds to the first node in the present disclosure.

In one embodiment, the second communication device 410 corresponds to the second node in the present disclosure.

In one embodiment, the second communication device 410 corresponds to the third node in the present disclosure.

In one embodiment, at least one of the antenna 452, the receiver 454, the multi-antenna receiving processor 458, the receiving processor 456, or the controller/processor 459 is used to receive the first information; at least one of the antenna 420, the transmitter 418, the multi-antenna transmitting processor 471, the transmitting processor 416, or the controller/processor 475 is used to transmit the first information.

In one embodiment, at least one of the antenna 452, the transmitter 454, the multi-antenna transmitting processor 457, the transmitting processor 468, or the controller/processor 459 is used to transmit the second information and third information; at least one of the antenna 420, the receiver 418, the multi-antenna receiving processor 472, the receiving processor 470, or the controller/processor 475 is used to receive the second information and third information.

In one embodiment, at least one of the antenna 452, the transmitter 454, the multi-antenna transmitting processor 457, the transmitting processor 468, or the controller/processor 459 is used to transmit the first radio signal; at least one of the antenna 420, the receiver 418, the multi-antenna receiving processor 472, the receiving processor 470, or the controller/processor 475 is used to receive the first radio signal.

In one embodiment, at least one of the multi-antenna transmitting processor 457, the transmitting processor 468 or the controller/processor 459 is used for monitoring fourth information.

In one embodiment, at least one of the antenna 452, the transmitter 454, the multi-antenna transmitting processor 457, the transmitting processor 468, or the controller/processor 459 is used to transmit the first radio signal; at least one of the antenna 420, the receiver 418, the multi-antenna receiving processor 472, the receiving processor 470, or the controller/processor 475 is used to receive the second radio signal.

In one embodiment, at least one of the antenna 452, the transmitter 454, the multi-antenna transmitting processor 457, the transmitting processor 468, or the controller/processor 459 is used to transmit the third radio signal; at least one of the antenna 420, the receiver 418, the multi-antenna receiving processor 472, the receiving processor 470, or the controller/processor 475 is used to receive the third radio signal.

In one embodiment, at least one of the antenna 452, the transmitter 454, the multi-antenna transmitting processor 457, the transmitting processor 468, or the controller/processor 459 is used to transmit the first parameter; at least one of the antenna 420, the receiver 418, the multi-antenna receiving processor 472, the receiving processor 470, or the controller/processor 475 is used to receive the first parameter.

In one embodiment, at least one of the antenna 452, the receiver 454, the multi-antenna receiving processor 458, the receiving processor 456, or the controller/processor 459 is used to receive the fourth radio signal; at least one of the antenna 420, the transmitter 418, the multi-antenna transmitting processor 471, the transmitting processor 416, or the controller/processor 475 is used to transmit the fourth radio signal.

In one embodiment, the first communication device 450 is a UE.

In one embodiment, the first communication device 450 is a UE supporting large delay difference.

In one embodiment, the first communication device 450 is a UE supporting NTN.

In one embodiment, the first communication device 450 is an aircraft.

In one embodiment, the first communication device 450 is capable of positioning.

In one embodiment, the first communication device 450 is incapable of positioning.

In one embodiment, the second communication device 410 is a base station (gNB/eNB).

In one embodiment, the second communication device 410 is a base station supporting large delay difference.

In one embodiment, the second communication device 410 is a base station supporting NTN.

In one embodiment, the second communication device 410 is satellite equipment.

In one embodiment, the second communication device 410 is a flight platform.

Embodiment 5

Figure 5:
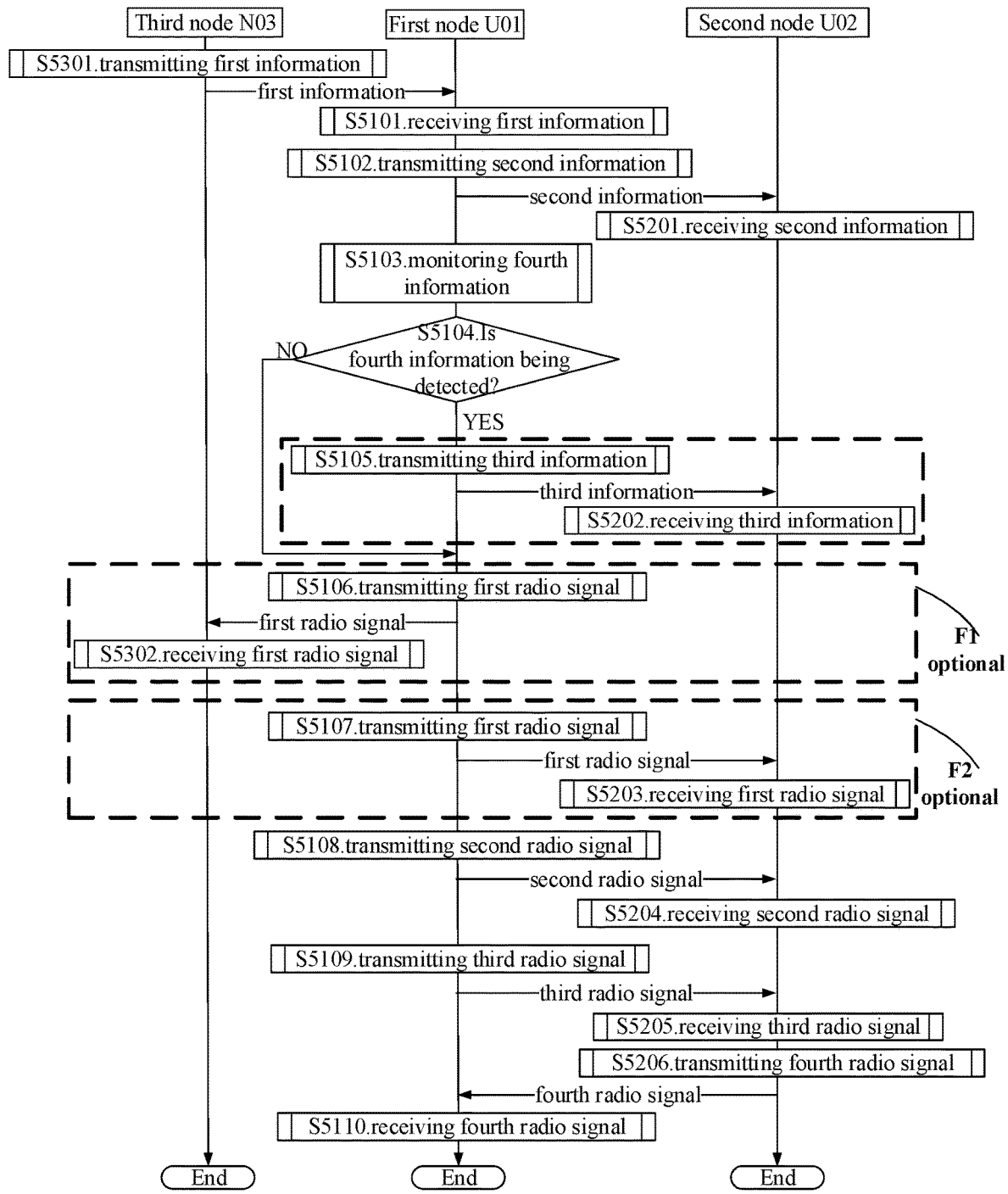
FIG. 5 illustrates a flowchart of radio signal transmission according to one embodiment of the present disclosure.

Embodiment 5 illustrates a flowchart of radio signal transmission according to one embodiment of the present disclosure, as shown in FIG. 5. A third node N03 is a maintenance base station for a serving cell of a first node U01; the third node N03 and the first node U01 are in communication via a Uu link; the first node U01 and the second node U02 are in communication via a sidelink; it should be particularly noted that the sequence illustrated herein does not restrict the orders of signal transmissions and implementations in the present disclosure.

The first node U01 receives first information in step S5101; transmits second information in step S5102; monitors fourth information in step S5103; and determines in step S5104 whether fourth information is detected; transmits third information in step S5105, and transmits a first radio signal in step S5106; transmits a first radio signal in step S5107, and transmits a second radio signal in step S5108, transmits a third radio signal in step S5109, and receives a fourth radio signal in step S5110.

The second node U02 transmits second information in step S5201; receives third information in step S5202; and receives a first radio signal in step S5203; receives a second radio signal in step S5204; receives a third radio signal in step S5205; and transmits a fourth radio signal in step S5206.

The third node N03 transmits first information in step S5301, and receives a first radio signal in step S5302.

In Embodiment 5, the first information in the present disclosure is used for indicating a first time window, the second information is used for indicating a second time window, and the third information is used for indicating whether the second time window is synchronous with the first time window; when the first radio signal is transmitted in a mainlink, the first radio signal is kept in synchronization with the first time window; when the first radio signal is transmitted in a sidelink, the first radio signal is kept in synchronization with the second time window; only when the fourth information is detected will the third information be transmitted; the second radio signal indicates a first time resource pool in the second time window; the third radio signal is used for indicating that the third node N03 is chosen as a synchronization reference source; when the third information indicates that the first time window is asynchronous with the second time window, the first transmitter transmits a first parameter; herein, the fourth information is used to determine the first parameter.

In one embodiment, the dotted-line box F1 exists, and the dotted-line box F2 does not exist.

In one embodiment, the dotted-line box F1 does not exist, and the dotted-line box F2 exists.

In one embodiment, the third node N03 is a base station (eNB).

In one embodiment, the third node N03 is a Non-Terrestrial Network (NTN) base station.

In one embodiment, the NTN base station is one of Geostationary Earth Orbiting (GEO) satellite, Medium Earth Orbiting (MEO) satellite, Low Earth Orbit (LEO) satellite, Highly Elliptical Orbiting (HEO) satellite or an Airborne Platform.

In one embodiment, the second node U02 is a UE.

In one embodiment, the second node U02 is a device used for sidelink communications.

In one embodiment, the third node N03 is a synchronization reference source for the first node U01.

In one embodiment, the first node U01 is a candidate synchronization reference source for a receiver for the second information.

In one embodiment, the synchronization reference source is a node to refer to for UE synchronization timing.

In one embodiment, the first information is used to determine a Downlink RadioFrame.

In one embodiment, the first information is used to determine an Uplink RadioFrame.

In one embodiment, the first information is all or part of a PHY (L1) signaling.

In one embodiment, the first information is all or part of a higher-layer (L2, L3) signaling.

In one embodiment, the first information is transmitted on a Physical Broadcast channel (PBCH).

In one embodiment, the first information comprises a MasterInformationBlock (MIB).

In one embodiment, the first information comprises a SystemInformationBlock (SIB).

In one embodiment, the first information is all or partial fields in a MeasResultsIE (i.e., InformationElement).

In one embodiment, the first information is all or partial fields in a MeasResultsIE (i.e., InformationElement).

In one embodiment, the first information is all or partial fields in a SL-CommResourcePoolIE (i.e., InformationElement).

In one embodiment, the first information is one of sl-Subframe, sl-SubframeRef, sl-Subframe-r14, or sl-SubframeRef-r15.

In one embodiment, the first information comprises a SystemFrameNumber (SFN).

In one embodiment, the first information comprises a SystemSubframeNumber.

In one embodiment, the first information is used for generating a Scrambling Sequence.

In one embodiment, the first information is all or part of a Media Access Control (MAC) layer signaling.

In one embodiment, the first information comprises all or part of a Media Access Control (MAC) RadomAccessResponse (RAR).

In one embodiment, the first information comprises a TimingAdvanceCommand (TAC) Media Access Control (MAC) ControlElement (CE).

In one embodiment, the first information comprises a MasterInformationBlock (MIB) and a TimingAdvanceCommand (TAC).

In one embodiment, the first time window is deduced by advancing a reception time for a synchronization signal received by the first node U01 by a first time offset.

In one embodiment, a TimingAdvanceCommand (TAC) Media Access Control (MAC) ControlElement (CE) comprised by the first information is used to indicate the first time offset.

In one embodiment, the first time offset is a time length by which the first time window is advanced relative to an uplink timing advance that is indicated by the first information.

In one embodiment, the first time offset is a time length by which the first time window is advanced relative to a downlink timing advance that is indicated by the first information.

In one embodiment, the first time offset is used to determine all delays between the third node N03 and the first node U01.

In one embodiment, the first time offset is used to determine a first delay between the third node N03 and the first node U01, not including a second delay.

In one embodiment, the first time offset is used to determine a first delay between the third node N03 and the first node U01, not including a second delay.

In one embodiment, the first delay is used to determine a UE DifferentialDelay between the third node N03 and the first node U01 due to geographical locations.

In one embodiment, the second delay is used to determine a CommonDelay, the CommonDelay referring to a delay corresponding to a shortest distance from the third node N03 to the earth's surface.

In one embodiment, the CommonDelay is notified to the UE by an NTN base station (eNB) via a SystemInformationBlock (SIB).

In one embodiment, the CommonDelay is performed with pre-compensation by the NTN base station (eNB) or the UE side.

In one embodiment, the first time window is explicitly indicated by the first information received by the first receiver.

In one embodiment, the first time window is implicitly indicated by the first information received by the first receiver.

In one embodiment, the first time window is deduced from a reception time for a synchronization signal received by the first node U01.

In one embodiment, the first time window is obtained according to a downlink synchronization timing.

In one embodiment, the first time window is obtained according to an uplink synchronization timing.

In one embodiment, the first time window is a cycle of a SystemFrameNumber (SFN).

In one embodiment, the first time window occurs periodically, and the period of the first time window is P slots, P being a positive integer.

In one embodiment, P is 1024, the P slots are contiguous.

In one embodiment, P is less than 1024, there is at least one slot interval, before which and after which there is a slot respectively belonging to the first time window.

In one embodiment, P is 10240, the P slots are contiguous.

In one embodiment, P is less than 10240, there is at least one slot interval, before which and after which there is a slot respectively belonging to the first time window.

In one embodiment, the slot is a radio frame.

In one embodiment, the slot is a radio subframe.

In one embodiment, the slot is multiple OFDM symbols.

In one embodiment, the slot is multiple SC-FDMA symbols.

In one embodiment, the second information comprises part of a MasterInformationBlock-SL.

In one embodiment, the second information comprises part of a MasterInformationBlock-SL-V2X.

In one embodiment, the second information is used to determine a sidelink synchronization timing.

In one embodiment, the second information is used for indicating transmission of Frame Numbers of a Sidelinksynchronizing signal (SLSS) and a Sidelink Broadcast Channel (SL-BCH).

In one embodiment, the second information comprises a DirectFrameNumber (DFN), the DFN occupying X bit(s), where X is a positive integer.

In one embodiment, X is equal to 10.

In one embodiment, the second information comprises a DirectSubframeNumber, where the DirectSubframeNumber is a positive integer.

In one embodiment, the DirectSubframeNumber is an integer ranging from 0 to 9.

In one embodiment, the second information comprises an X-th time offset.

In one embodiment, the second information comprises one of a SL-OffsetIndicatorSync, a syncOffsetIndicator, a directSubframeNumber, a directSubframeNumber-r12, a directSubframeNumber, a directFrameNumber, a directFrameNumber-r12, or a directFrameNumber.

In one embodiment, the syncOffsetIndicator is equal to (10*DFN+subframe number) mod 40, where the DFN refers to a DirectFrameNumber, the subframe number is a subframe number, and the mod refers to mode operation.

In one embodiment, the SL-OffsetIndicatorSync is equal to (10*DFN+subframe number) mod 160, where the DFN refers to a DirectFrameNumber, the subframe number is a sub-frame number, and the mod refers to mode operation.

In one embodiment, the second time window is explicitly indicated by the second information transmitted by the first transmitter.

In one embodiment, the second time window is implicitly indicated by the second information transmitted by the first transmitter.

In one embodiment, the second time window is used to determine a Sidelink RadioFrame.

In one embodiment, the second time window is a cycle of a DirectFrameNumber (DFN).

In one embodiment, the second time window occurs periodically, and the period of the second time window is Q slots, Q being a positive integer.

In one embodiment, Q is 1024, the Q slots are contiguous.

In one embodiment, Q is less than 1024, there is at least one slot interval, before which and after which there is a slot respectively belonging to the second time window.

In one embodiment, Q is 10240, the Q slots are contiguous.

In one embodiment, Q is less than 10240, there is at least one slot interval, before which and after which there is a slot respectively belonging to the second time window.

In one embodiment, the slot is a radio frame.

In one embodiment, the slot is a radio subframe.

In one embodiment, the slot is multiple OFDM symbols.

In one embodiment, the slot is multiple SC-FDMA symbols.

In one embodiment, when a gap between a start time for the second time window and a start time for the first time window does not exceed a first time length, the second time window is synchronous with the first time window; otherwise, the second time window is asynchronous with the first time window.

In one embodiment, the first time length is related to a maximum adjustment time length of a TAC comprised in the first information.

In one embodiment, when a start time for the second time window and a start time for the first time window are the same, the second time window is synchronous with the first time window; otherwise, the second time window is asynchronous with the first time window.

In one embodiment, when the first time window is advanced by the first time offset compared with the second time window, the first time window is synchronous with the second time window.

In one embodiment, the first time window is used to determine a TimingReferenceRadioframe of the second time window.

In one embodiment, a duration of the second time window is the same as a duration of the first time window.

In one embodiment, a duration of the second time window is different from a duration of the first time window.

In one embodiment, a second time window is obtained by advancing the first time window by the first time offset.

In one embodiment, the third information is an indicator, the indicator occupying N bit(s), where N is a positive integer.

In one embodiment, when the N is equal to 1, the indicator being equal to 1 denotes that the second time window is synchronous with the first time window, while the indicator being equal to 0 denotes that the second time window is asynchronous with the first time window.

In one embodiment, when the N is equal to 1, the indicator being equal to 1 denotes that the second time window is asynchronous with the first time window, while the indicator being equal to 0 denotes that the second time window is synchronous with the first time window.

In one embodiment, the third information being a null value denotes that the second time window is synchronous with the first time window, while the third information not being a null value denotes that the second time window is asynchronous with the first time window.

In one embodiment, the third information being a null value denotes that the second time window is asynchronous with the first time window, while the third information not being a null value denotes that the second time window is synchronous with the first time window.

Embodiment 6

Embodiment 6 illustrates a schematic diagram of a first time offset between a first time window and a second time window according to one embodiment of the present disclosure, as shown in FIG. 6. The horizontal axis is a time-domain coordinate, the box filled with slashes represents a first time window, and the box filled with diamonds represents a second time window.

In one embodiment, the first time offset is a time length by which the first time window is advanced relative to an uplink timing advance that is indicated by the first information.

In one embodiment, the first time offset is a time length by which the first time window is advanced relative to a downlink timing advance that is indicated by the first information.

In one embodiment, the first time offset is used to determine all delays between a transmitter for the first information and the first node.

In one embodiment, the first time offset is used to determine a first delay between a transmitter for the first information and the first node, not including a second delay.

In one embodiment, the first time offset is used to determine a first delay between a transmitter for the first information and the first node, not including a second delay.

In one embodiment, the first delay is used to determine a UE DifferentialDelay between a transmitter for the first information and the first node due to geographical locations.

In one embodiment, the second delay is used to determine a CommonDelay, the CommonDelay referring to a delay corresponding to a shortest distance from a transmitter for the first information to the earth's surface.

In one embodiment, when a gap between a start time for the second time window and a start time for the first time window does not exceed a first time length, the second time window is synchronous with the first time window; otherwise, the second time window is asynchronous with the first time window.

In one embodiment, the first time length is related to a maximum adjustment time length of a TAC comprised in the first information.

In one embodiment, when a start time for the second time window and a start time for the first time window are the same, the second time window is synchronous with the first time window; otherwise, the second time window is asynchronous with the first time window.

In one embodiment, when the first time window is advanced by the first time offset compared with the second time window, the first time window is synchronous with the second time window.

Embodiment 7

Embodiment 7 illustrates a schematic diagram of time-domain resources for transmitting a first radio signal according to one embodiment of the present disclosure, as shown in FIG. 7. The horizontal axis is a time-domain coordinate, the box filled with slashes represents a first time window, and the box filled with diamonds represents a second time window, and the grid-filled box represents time-domain resources occupied by any radio signal.

In Embodiment 7, the first transmitter transmits a first radio signal; when the first radio signal is transmitted in a mainlink, the first radio signal is kept in synchronization with the first time window; when the first radio signal is transmitted in a sidelink, the first radio signal is kept in synchronization with the second time window.

In one embodiment, the mainlink is a link between a base station (eNB) and a UE.

In one embodiment, the mainlink is an uplink (UL), the first node is a UE.

In one embodiment, the mainlink is a link between a transmitter for the first information and the first node.

In one embodiment, the sidelink (SL) refers to a radio link between UEs.

In one embodiment, the sidelink (SL) includes one of a Device-to-Device (D2D) link, an End-to-End link, a Point-to-Point link, or a Vehicle-to-Everything (V2X) link.

In one embodiment, the sidelink (SL) refers to a link between the first node and a receiver for the second information.

In one embodiment, the first node is a UE, the mainlink is an uplink between the first node and a transmitter for the first information, and the sidelink (SL) is a link between the first node and a receiver for the second information.

In one embodiment, the phrase that the first radio signal is kept in synchronization with the first time window comprises:
the first radio signal is transmitted at a start of the first time window.

In one embodiment, the phrase that the first radio signal is kept in synchronization with the first time window comprises:
a transmission time for the first radio signal is advanced by a first time offset compared with a start of the first time window.

In one embodiment, the phrase that the first radio signal is kept in synchronization with the first time window comprises:
the first radio signal is transmitted in a position indicated by the first information in the first time window.

In one embodiment, the phrase that the first radio signal is kept in synchronization with the first time window comprises:
a transmission time for the first radio signal is advanced by a first time offset compared with a position in the first time window indicated by the first information.

In one embodiment, the phrase that the first radio signal is kept in synchronization with the second time window means:
the first radio signal is transmitted at a start of the second time window.

In one embodiment, the phrase that the first radio signal is kept in synchronization with the second time window means:
a transmission time for the first radio signal is advanced by a first time offset compared with a start of the second time window.

In one embodiment, the phrase that the first radio signal is kept in synchronization with the second time window means:
the first radio signal is transmitted in a position indicated by the second information in the second time window.

In one embodiment, the phrase that the first radio signal is kept in synchronization with the second time window means:
a transmission time for the first radio signal is advanced by a first time offset compared with a position in the second time window indicated by the second information.

In one embodiment, when the first radio signal is transmitted on a mainlink, the first radio signal is an uplink signal.

In one embodiment, when the first radio signal is transmitted on a mainlink, the first radio signal is a Random Access Preamble.

In one embodiment, when the first radio signal is transmitted on a mainlink, the first radio signal is a Demodulation Reference Signal (DMRS).

In one embodiment, when the first radio signal is transmitted on a sidelink, the first radio signal is a sidelink signal.

In one embodiment, when the first radio signal is transmitted on a sidelink, the first radio signal is a Sidelink Synchronizing Signal (SLSS).

In one embodiment, the SLSS comprises a Primary sidelink synchronization signal (PSLSS) and a Secondary sidelink synchronization signal (SSLSS).

In one embodiment, the PSLSS is transmitted on neighboring multicarrier symbols in a same sub-frame.

In one embodiment, the multicarrier symbol is a SC-FDMA symbol.

In one embodiment, the multicarrier symbol is an OFDM symbol.

In one embodiment, when the first radio signal is transmitted on a sidelink, the first radio signal is a Demodulation Reference Signal (DMRS).

Embodiment 8

Embodiment 8 illustrates a schematic diagram of fourth information being detected to be used for determining to transmit third information according to one embodiment of the present disclosure, as shown in FIG. 8.

In Embodiment 8, the first node monitors fourth information; herein, only when the fourth information is detected will the third information be transmitted.

In one embodiment, the fourth information is used for indicating that a height of a transmitter for the first information exceeds a first reference height.

In one embodiment, the first reference height is configurable.

In one embodiment, the first reference height is fixed.

In one embodiment, the first reference height is a height of a satellite orbit.

In one embodiment, a unit of measurement of the first reference height is one of meter, decameter, hectometer, kilometer, or myriameter.

In one embodiment, the fourth information is used for indicating that a transmitter for the first information is an NTN base station.

In one embodiment, the NTN base station is one of Geostationary Earth Orbiting (GEO) satellite, Medium Earth Orbiting (MEO) satellite, Low Earth Orbit (LEO) satellite, Highly Elliptical Orbiting (HEO) satellite or an Airborne Platform.

In one embodiment, the fourth information comprises a TimingAdvanceCommand (TAC), a maximum adjustment time of the TAC comprised in the fourth information is smaller than a first reference time length.

In one embodiment, the fourth information comprises all or part of a Media Access Control (MAC) RadomAccess-Response (RAR), a maximum adjustment time of a TimingAdvanceCommand (TAC) contained in the MAC RAR is smaller than a second reference time length.

In one embodiment, the fourth information is used for indicating a first pre-compensation, the first pre-compensation referring to a delay generated for a smallest distance from an NTN base station to the ground.

In one embodiment, the first reference time length is configurable.

In one embodiment, the second reference time length is configurable.

In one embodiment, a sequence-coherent-detection is utilized to monitor the fourth information.

In one embodiment, monitoring energy of the fourth information, when the energy detected is no lower than a first energy threshold, it is denoted that the fourth information is detected; when the energy detected is lower than a first energy threshold, it is denoted that the fourth information is not detected.

In one embodiment, monitoring Cyclic Redundancy Check (CRC) of the second sequence and first sequence, the first sequence and the second sequence are pre-configured, and the first sequence and the second sequence are known to the first node. The fourth information is used to determine a second sequence, when the fourth information does not exist, a result of CRC of the first sequence and the second sequence is a first result, when the fourth information exists, the second sequence changes, and the result of CRC of the first sequence and the second sequence is a second result, the first result denotes that the fourth information is not detected, while the second result denotes that the fourth information is detected.

Embodiment 9

Embodiment 9 illustrates a schematic diagram of a second radio signal used to indicate a first time resource pool according to one embodiment of the present disclosure, as shown in FIG. 9.

In Embodiment 9, the first transmitter transmits a second radio signal; herein, the second radio signal indicates a first time resource pool in the second time window.

In one embodiment, the second radio signal comprises all or part of a higher-layer signal.

In one embodiment, the second radio signal comprises all or part of a physical-layer signal.

In one embodiment, the second radio signal comprises all or part of Information Elements (IEs) in a Radio Resource Control (RRC) signaling.

In one embodiment, the second radio signal comprises all or part of fields in an Information Element (IE) in an RRC signaling.

In one embodiment, the second radio signal is all or partial fields in a SL-CommResourcePoolIE.

In one embodiment, the second radio signal is all or partial fields in a SL-OffsetIndicatorIE.

In one embodiment, the second radio signal is all or partial fields in a SL-PreconfigurationIE.

In one embodiment, the second radio signal is all or partial fields in a SL-V2X-PreconfigurationIE.

In one embodiment, the second radio signal is a sl-Subframe.

In one embodiment, the second radio signal is a sl-OffsetIndicator.

In one embodiment, the second radio signal indicates a first time-frequency resource pool, the first time-frequency resource pool occupying the first time resource pool in time domain.

In one embodiment, the second radio signal is used for indicating a position of the first time resource pool in the second time window.

In one embodiment, the second radio signal is used for indicating a start time for the first time resource pool in the second time window.

In one embodiment, the second radio signal is used for indicating a second time offset of the first time resource pool relative to a start of the second time window.

In one embodiment, when the second time offset is equal to 0, an SFN of a start time for the first time resource pool is equal to 0.

In one embodiment, the first time resource pool is comprised of multiple slots.

In one embodiment, the first time resource pool is comprised of multiple subframes.

In one embodiment, the first time resource pool is comprised of multiple radio frames.

In one embodiment, the first time resource pool occurs repeatedly in the second time window.

In one embodiment, the first time resource pool comprises I same bitmaps, each said bitmap occupying J bits, where both I and J are configurable positive integers.

In one embodiment, the first time resource pool is no larger than the second time window.

In one embodiment, the first time-frequency resource pool is reserved for a D2D transmission.

In one embodiment, the first time-frequency resource pool is reserved for a V2X transmission.

In one embodiment, the first time-frequency resource pool is a D2D Resource Pool.

In one embodiment, the second receiver receives a sixth radio signal in the first time resource pool, a transmitter for the sixth radio signal being a transmitter for the second radio signal, the sixth radio signal is kept in synchronization with the second time window.

In one embodiment, the second transmitter transmits a HARQ-ACK for the sixth radio signal in the first time resource pool, the HARQ-ACK for the sixth radio signal being kept in synchronization with the second time window.

Embodiment 10

Embodiment 10 illustrates a schematic diagram of a third radio signal being used to indicate a synchronization reference source according to one embodiment of the present disclosure, as shown in FIG. 10.

In Embodiment 10, the first transmitter transmits a third radio signal; herein, the third radio signal is used for indicating that a transmitter for the first information is chosen as a synchronization reference source.

In one embodiment, the third radio signal is used for indicating a type of a synchronization reference source for the first node.

In one embodiment, the type of the synchronization reference source includes one of Global Navigation Satellite System (GNSS), a first base-station type or UserEquipment (UE).

In one embodiment, the first base-station type comprises TN eNB.

In one embodiment, the first base-station type comprises NTN eNB.

In one embodiment, the third radio signal comprises all or part of Information Elements (IEs) in an RRC signaling.

In one embodiment, the third radio signal comprises all or part of fields in an Information Element (IE) in an RRC signaling.

In one embodiment, the third radio signal comprises all or part of fields in a SL-V2X-UE-ConfigListIE (i.e., InformationElement).

In one embodiment, the third radio signal comprises all or part of fields in a SL-PSSCH-TxConfigListIE (i.e., InformationElement).

In one embodiment, the third radio signal comprises all or part of fields in a SL-TypeTxSyncIE (i.e., InformationElement).

In one embodiment, the third radio signal comprises all or part of fields in a SL-V2X-ConfigDedicatedIE (i.e., InformationElement).

In one embodiment, the third radio signal is typeTxSync.

Embodiment 11

Embodiment 11 illustrates a schematic diagram of fourth information used to determine a first parameter according to one embodiment of the present disclosure, as shown in FIG. 11.

In Embodiment 11, when the third information indicates that the first time window is asynchronous with the second time window, transmit a first parameter; herein, the fourth information is used to determine the first parameter.

In one embodiment, the first parameter comprises a height of a transmitter for the first node.

In one embodiment, the first parameter comprises a type of a transmitter for the first node.

In one embodiment, the first parameter comprises a second offset of a transmitter for the first node.

In one embodiment, the second offset is a Pre-compensation value for a transmitter for the first information.

In one embodiment, the second offset is transmitted to the first node by a transmitter for the first information.

In one embodiment, the second offset is transmitted to the first node by a transmitter for the first information through a TimingAdvanceCommand (TAC) Media Access Control (MAC) ControlElement (CE).

In one embodiment, the second offset is transmitted to the first node by a transmitter for the first information through a Media Access Control (MAC) RadomAccessResponse (RAR).

In one embodiment, the second offset is transmitted to the first node by a transmitter for the first information through a Radio Resource Control (RRC) signaling.

In one embodiment, the second offset is transmitted to the first node by a transmitter for the first information through a SystemInformationBlock (SIB) message.

In one embodiment, the second offset is obtained by the first node through calculation.

In one embodiment, the second offset is obtained by the first node through calculating information of UserEquipment (UE) Location/Satellite Ephemeris/Time.

Embodiment 12

Embodiment 12 illustrates a schematic diagram of a reception timing for a synchronization signal transmitted by a synchronization reference source being used to determine a transmission timing for a fourth radio signal according to one embodiment of the present disclosure, as shown in FIG. 12.

In Embodiment 12, the second node determines a synchronization reference source; and transmits a fourth radio signal; herein, a reception timing for a synchronization signal transmitted by the synchronization reference source which is determined is used to determine a transmission timing for the fourth radio signal, the third information is used to determine whether a transmitter for the second information is chosen as a synchronization reference source.

In one embodiment, the synchronization signal transmitted by the synchronization reference source determined by the second receiver comprises a synchronization sequence.

In one embodiment, the synchronization signal transmitted by the synchronization reference source determined by the second receiver comprises a PSBCH.

In one embodiment, the synchronization signal transmitted by the synchronization reference source determined by the second receiver is broadcast.

In one embodiment, a start time for a slot occupied by the fourth radio signal is related to a start time for a slot occupied by the synchronization signal transmitted by the synchronization reference source determined by the second receiver in the second node.

In one embodiment, a start time for a time window to which the fourth radio signal belongs is advanced by a second time length compared with a start time for a time window to which the synchronization signal transmitted by the synchronization reference source determined by the second receiver belongs in the second node.

In one embodiment, the synchronization reference source determined by the second receiver indicates the second time length.

In one embodiment, with other conditions staying unchanged, compared with a case in which the third information indicates that the second time window is asynchronous with the first time window, when the third information indicates that the second time window is synchronous with the first time window, a transmitter for the second information is of a higher priority of being chosen as a synchronization reference source.

In one embodiment, when the third information indicates that the second time window is asynchronous with the first time window, the second node chooses a transmitter for the first information as a synchronization reference source; when the third information indicates that the second time window is synchronous with the first time window, the second node chooses the transmitter for the second information as a synchronization reference source.

In one subembodiment, the second node is incapable of positioning.

In one subembodiment, the second node is only within the coverage of a transmitter for the first information.

Embodiment 13

Embodiment 13 illustrates a schematic diagram of selecting a synchronization reference source from K candidate synchronization reference sources according to one embodiment of the present disclosure, as shown in FIG. 13.

In Embodiment 13, a second receiver chooses a synchronization reference source from K candidate synchronization reference sources according to a first priority, where the synchronization reference source is one of the K candidate synchronization reference sources, of which the first priority is highest, the first priority is related to parameters for the candidate synchronization reference source, where K is a positive integer greater than 1.

In one embodiment, parameters for the candidate synchronization reference source comprise a type of a synchronization reference source for the candidate synchronization reference source.

In one embodiment, the type of the synchronization reference source for the candidate synchronization reference source includes GNSS, SyncRef UE, TN base station, and NTN base station.

In one embodiment, when the type of the synchronization reference source for the candidate synchronization reference source is NTN base station, the first priority is related to the third information.

In one embodiment, in a case when each synchronization reference source for the candidate synchronization reference source is an NTN base station, the first priority of a candidate synchronization reference source corresponding to the fact that the candidate third information indicates the candidate second time window being synchronous with the candidate first time window is higher than the first priority of a candidate synchronization reference source corresponding to the fact that the candidate third information indicates the candidate second time window being asynchronous with the candidate first time window.

In one embodiment, in a case when a synchronization reference source for a said candidate synchronization reference source is an NTN base station while a synchronization reference source for a said candidate synchronization reference source is of other type, the first priority of a candidate synchronization reference source corresponding to the fact that the candidate third information indicates the candidate second time window being synchronous with the candidate first time window is higher than the first priority of the other candidate synchronization reference source.

In one embodiment, UE1, UE2, UE3, UE4, UE5, TN base station1 and GNSS are all candidate synchronization reference sources for UE0.

In one embodiment, the NTN base station is a synchronization reference source for the UE1 and the UE2, UE6 is a synchronization reference source for UE3, UE7 is a synchronization reference source for UE4, UE8 is a synchronization reference source for UE5, UE9 is a synchronization reference source for UE6, TN base station 2 is a synchronization reference source for UE7, and GNSS is a synchronization reference source for UE8.

In one embodiment, the UE1 and the UE2 are both candidate synchronization reference sources for the UE0, and synchronization reference sources for the UE1 and the UE2 are both an NTN base station, but since a candidate first time window and a candidate second time window for the UE1 are already synchronous, while a candidate first time window and a candidate second time window for the UE2 are asynchronous, the UE0 will choose the UE2 as a synchronization reference source.

In one embodiment, the UE1 and the UE3 are both candidate synchronization reference sources for the UE0, a synchronization reference source for the UE3 is the UE6, a synchronization reference source for the UE6 is the UE9, a synchronization reference source for the UE1 is an NTN base station, and, since a candidate first time window and a candidate second time window for the UE1 are already synchronous, the UE0 will choose the UE1 as a synchronization reference source.

In one embodiment, the UE1 and the UE4 are both candidate synchronization reference sources for the UE0, a synchronization reference source for the UE4 is the UE7, a synchronization reference source for the UE7 is the TN base station 2, a synchronization reference source for the UE1 is an NTN base station, and, since a candidate first time window and a candidate second time window for the UE1 are already synchronous, the UE0 will choose the UE1 as a synchronization reference source.

In one embodiment, the UE1 and the UE5 are both candidate synchronization reference sources for the UE0, a synchronization reference source for the UE5 is the UE8, a synchronization reference source for the UE8 is GNSS, a synchronization reference source for the UE1 is an NTN base station, and, since a candidate first time window and a candidate second time window for the UE1 are already synchronous, the UE0 will choose the UE1 as a synchronization reference source.

Embodiment 14

Figure 14:
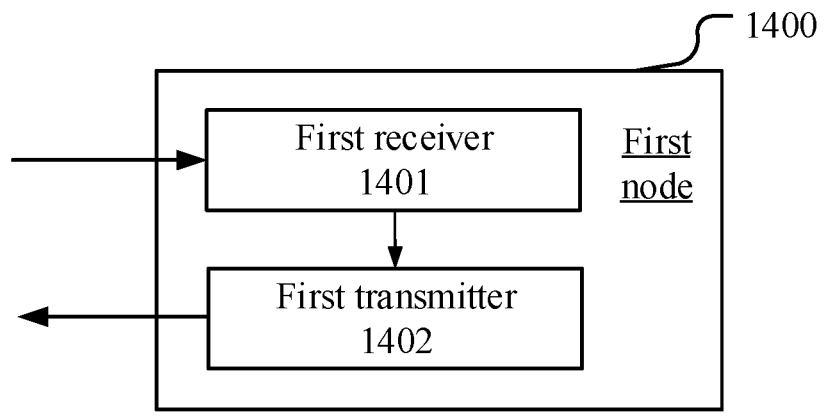
FIG. 14 illustrates a structure block diagram of a processing device used in a first node according to one embodiment of the present disclosure.

Embodiment 14 illustrates a structure block diagram of a processing device used in a first node according to one embodiment of the present disclosure; as shown in FIG. 14. In FIG. 14, a processing device 1400 in the first node is comprised of a first receiver 1401 and a first transmitter 1402.

The first receiver 1401 receives first information; and
the first transmitter 1402 transmits second information and third information.

In Embodiment 14, the first information is used for indicating a first time window, the second information is used for indicating a second time window, and the third information is used for indicating whether the second time window is synchronous with the first time window.

In one embodiment, the first transmitter 1402 transmits a first radio signal; when the first radio signal is transmitted in a mainlink, the first radio signal is kept in synchronization with the first time window; when the first radio signal is transmitted in a sidelink, the first radio signal is kept in synchronization with the second time window.

In one embodiment, the first receiver 1402 monitors fourth information; herein, only when the fourth information is detected will the third information be transmitted.

In one embodiment, the first transmitter 1402 transmits a second radio signal; herein, the second radio signal indicates a first time resource pool in the second time window.

In one embodiment, the first transmitter 1402 transmits a third radio signal; herein, the third radio signal is used for indicating that a transmitter for the first information is chosen as a synchronization reference source.

In one embodiment, when the third information indicates that the first time window is asynchronous with the second time window, the first transmitter 1402 transmits a first parameter; herein, the fourth information is used to determine the first parameter.

In one embodiment, the first transmitter 1402 comprises the antenna 452, the transmitter 454, the multi-antenna transmitting processor 457, the transmitting processor 468, the controller/processor 459, the memory 460 and the data source 467 in FIG. 4 of the present disclosure.

In one embodiment, the first transmitter 1402 comprises the antenna 452, the transmitter 454, the multi-antenna transmitting processor 457 and the transmitting processor 468 in FIG. 4 of the present disclosure.

In one embodiment, the first transmitter 1402 comprises the antenna 452, the transmitter 454 and the transmitting processor 468 in FIG. 4 of the present disclosure.

In one embodiment, the first receiver 1401 comprises the antenna 452, the receiver 454, the multi-antenna receiving processor 458, the receiving processor 456, the controller/processor 459, the memory 460 and the data source 467 in FIG. 4 of the present disclosure.

In one embodiment, the first receiver 1401 comprises the antenna 452, the receiver 454, the multi-antenna receiving processor 458 and the receiving processor 456 in FIG. 4 of the present disclosure.

In one embodiment, the first receiver 1401 comprises the antenna 452, the receiver 454 and the receiving processor 456 in FIG. 4 of the present disclosure.

Embodiment 15

Figure 15:
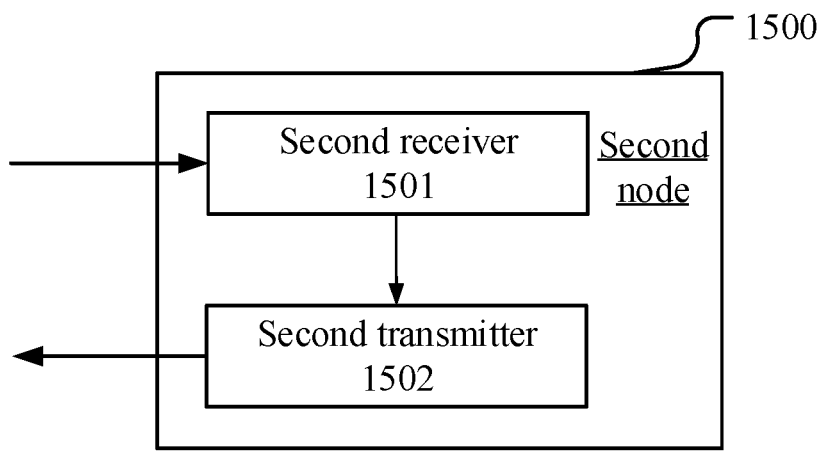
FIG. 15 illustrates a structure block diagram of a processing device used in a second node according to one embodiment of the present disclosure.

Embodiment 15 illustrates a structure block diagram of a processing device used in a second node according to one embodiment of the present disclosure; as shown in FIG. 15. In FIG. 15, a processing device 1500 in the second node is comprised of a second receiver 1501 and a second transmitter 1502.

The second receiver 1501 receives second information and third information.

In Embodiment 15, the second information is used for indicating a second time window, the third information is used for indicating whether the second time window is synchronous with a first time window, the first time window being indicated by first information.

In one embodiment, the second receiver determines a synchronization reference source; the second transmitter 1502 transmits a fourth radio signal; herein, a reception timing for a synchronization signal transmitted by the synchronization reference source which is determined by the second receiver is used to determine a transmission timing for the fourth radio signal, the third information is used to determine whether a transmitter for the second information is chosen as a synchronization reference source.

In one embodiment, the second receiver 1501 receives a first radio signal; the first radio signal is kept in synchronization with the second time window.

In one embodiment, the second receiver 1501 receives a second radio signal; herein, the second radio signal indicates a first time resource pool in the second time window.

In one embodiment, the second receiver 1501 receives a third radio signal; herein, the third radio signal is used for indicating that a transmitter for the first information is chosen as a synchronization reference source for a transmitter for the third information.

In one embodiment, when the third information indicates that the first time window is asynchronous with the second time window, the second receiver 1501 receives a first parameter; herein, the fourth information is used to determine the first parameter.

In one embodiment, the first information is downlink information.

In one embodiment, the first information is received by a transmitter for the second information.

In one embodiment, the first information is transmitted by a synchronization reference source for a first node, the first node being a transmitter for the second information.

In one embodiment, the second transmitter 1502 comprises the antenna 452, the transmitter 454, the multi-antenna transmitting processor 457, the transmitting processor 468, the controller/processor 459, the memory 460 and the data source 467 in FIG. 4 of the present disclosure.

In one embodiment, the second transmitter 1502 comprises the antenna 452, the transmitter 454, the multi-antenna transmitting processor 457 and the transmitting processor 468 in FIG. 4 of the present disclosure.

In one embodiment, the second transmitter 1502 comprises the antenna 452, the transmitter 454 and the transmitting processor 468 in FIG. 4 of the present disclosure.

In one embodiment, the second receiver 1401 comprises the antenna 452, the receiver 454, the multi-antenna receiving processor 458, the receiving processor 456, the controller/processor 459, the memory 460 and the data source 467 in FIG. 4 of the present disclosure.

In one embodiment, the second receiver 1401 comprises the antenna 452, the receiver 454, the multi-antenna receiving processor 458 and the receiving processor 456 in FIG. 4 of the present disclosure.

In one embodiment, the second receiver 1401 comprises the antenna 452, the receiver 454 and the receiving processor 456 in FIG. 4 of the present disclosure.

Embodiment 16

Figure 16:
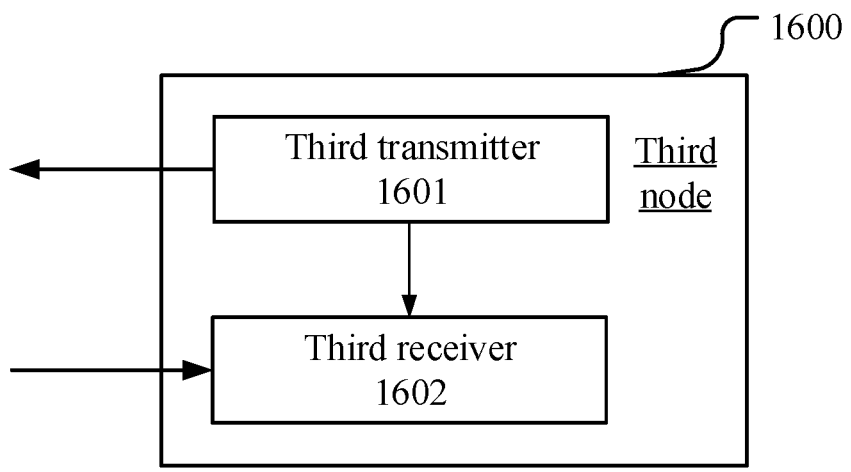
FIG. 16 illustrates a structure block diagram of a processing device used in a third node according to one embodiment of the present disclosure.

Embodiment 16 illustrates a structure block diagram of a processing device used in a third node according to one embodiment of the present disclosure; as shown in FIG. 16. In FIG. 16, a processing device 1600 in the third node is comprised of a third transmitter 1601 and a third receiver 1602.

The third transmitter 1601 transmits first information.

In Embodiment 16, the first information is used for indicating a first time window, the second information is used for indicating a second time window, and the third information is used for indicating whether the second time window is synchronous with the first time window.

In one embodiment, the third receiver 1602 receives a first radio signal; when the first radio signal is received in a mainlink, the first radio signal is kept in synchronization with the first time window; when the first radio signal is received in a sidelink, the first radio signal is kept in synchronization with the second time window.

In one embodiment, a receiver for the first information monitors fourth information; herein, only when the fourth information is detected will the third information be transmitted by the receiver for the first information, the fourth information being a parameter of the third node.

In one embodiment, a second radio signal is transmitted by a receiver for the first information; herein, the second radio signal indicates a first time resource pool in the second time window.

In one embodiment, a third radio signal is transmitted by a receiver for the first information; herein, the third radio signal is used for indicating that the third node is chosen as a synchronization reference source.

In one embodiment, when the third information indicates that the first time window is asynchronous with the second time window, a first parameter is transmitted by a receiver for the first information; herein, the fourth information is used to determine the first parameter.

In one embodiment, a receiver for the first information is a UE.

In one embodiment, the second information is transmitted to other UEs by a receiver for the first information.

In one embodiment, the third transmitter 1601 comprises the antenna 420, the transmitter 418, the multi-antenna transmitting processor 471, the transmitting processor 416, the controller/processor 475, and the memory 476 in FIG. 4 of the present disclosure.

In one embodiment, the third transmitter 1601 comprises the antenna 420, the transmitter 418, the multi-antenna transmitting processor 471 and the transmitting processor 416 in FIG. 4 of the present disclosure.

In one embodiment, the third transmitter 1601 comprises the antenna 420, the transmitter 418 and the transmitting processor 416 in FIG. 4 of the present disclosure.

In one embodiment, the third receiver 1602 comprises the antenna 420, the receiver 418, the multi-antenna receiving processor 472, the receiving processor 470, the controller/processor 475, the memory 476 and the data source 467 in FIG. 4 of the present disclosure.

In one embodiment, the third receiver 1602 comprises the antenna 420, the receiver 418, the multi-antenna receiving processor 472 and the receiving processor 470 in FIG. 4 of the present disclosure.

In one embodiment, the third receiver 1602 comprises the antenna 420, the receiver 418 and the receiving processor 470 in FIG. 4 of the present disclosure.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE and terminal in the present disclosure include but are not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things (JOT), RFID terminals, NB-IOT terminals, Machine Type Communication (MTC) terminals, enhanced MTC (eMTC) terminals, data cards, low-cost mobile phones, low-cost tablet computers, etc. The base station or system device in the present disclosure includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node for wireless communications, comprising:
a first receiver configured to receive first information; and
a first transmitter configured to transmit second information and third information, wherein the first information indicates a first time window, the second information indicates a second time window, and the third information indicates whether the second time window is synchronous with the first time window,
wherein when the third information is equal to a first value, the third information indicates that second time window is synchronous with the first time window, and when the third information is equal to a second value different from the first value, the third information indicates that the second time window is asynchronous with the first time window.

2. The first node according to claim 1,
wherein the first transmitter is configured to transmit a first radio signal, and
wherein when the first radio signal is transmitted in a mainlink, the first radio signal is kept in synchronization with the first time window and when the first radio signal is transmitted in a sidelink, the first radio signal is kept in synchronization with the second time window.

3. The first node according to claim 1, wherein the first receiver is configured to monitor fourth information, wherein only when the fourth information is detected will the third information be transmitted.

4. The first node according to claim 3 wherein the first transmitter is configured to transmit a first parameter when the third information indicates that the first time window is asynchronous with the second time window, and wherein the fourth information is used to determine the first parameter.

5. The first node according to claim 1, wherein the first time window is explicitly indicated by the first information received by the first receiver.

6. The first node according to claim 1, wherein the first time window is implicitly indicated by the first information received by the first receiver.

7. The first node according to claim 1, wherein the first transmitter is configured to transmit a second radio signal, wherein the second radio signal indicates a first time resource pool in the second time window.

8. The first node according to claim 1, wherein the first transmitter is configured to transmit a third radio signal, wherein the third radio signal indicates that a transmitter for the first information is chosen as a synchronization reference source.

9. A method in a first node for wireless communications, comprising:

receiving first information; and transmitting second information and third information, wherein the first information indicates a first time window, the second information indicates a second time window, and the third information indicates whether the second time window is synchronous with the first time window, wherein when the third information is equal to a first value, the third information indicates that second time window is synchronous with the first time window, and when the third information is equal to a second value different from the first value, the third information indicates that the second time window is asynchronous with the first time window.

10. The method according to claim 9, further comprising transmitting a third radio signal, wherein the third radio signal indicates that a transmitter for the first information is chosen as a synchronization reference source.

11. The method according to claim 9, further comprising transmitting a first parameter when the third information indicates that the first time window is asynchronous with the second time window.

* * * * *